INVENTOR.
B. F. WILEY

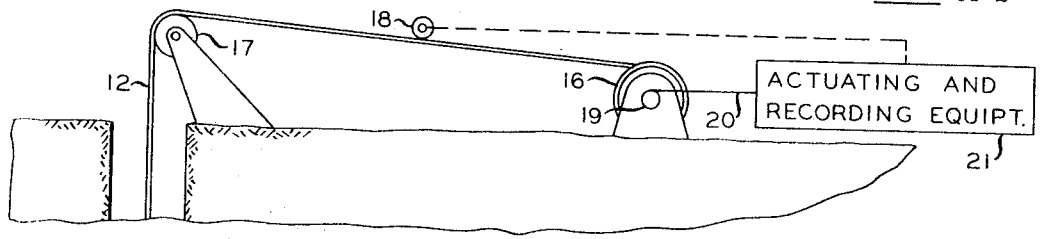
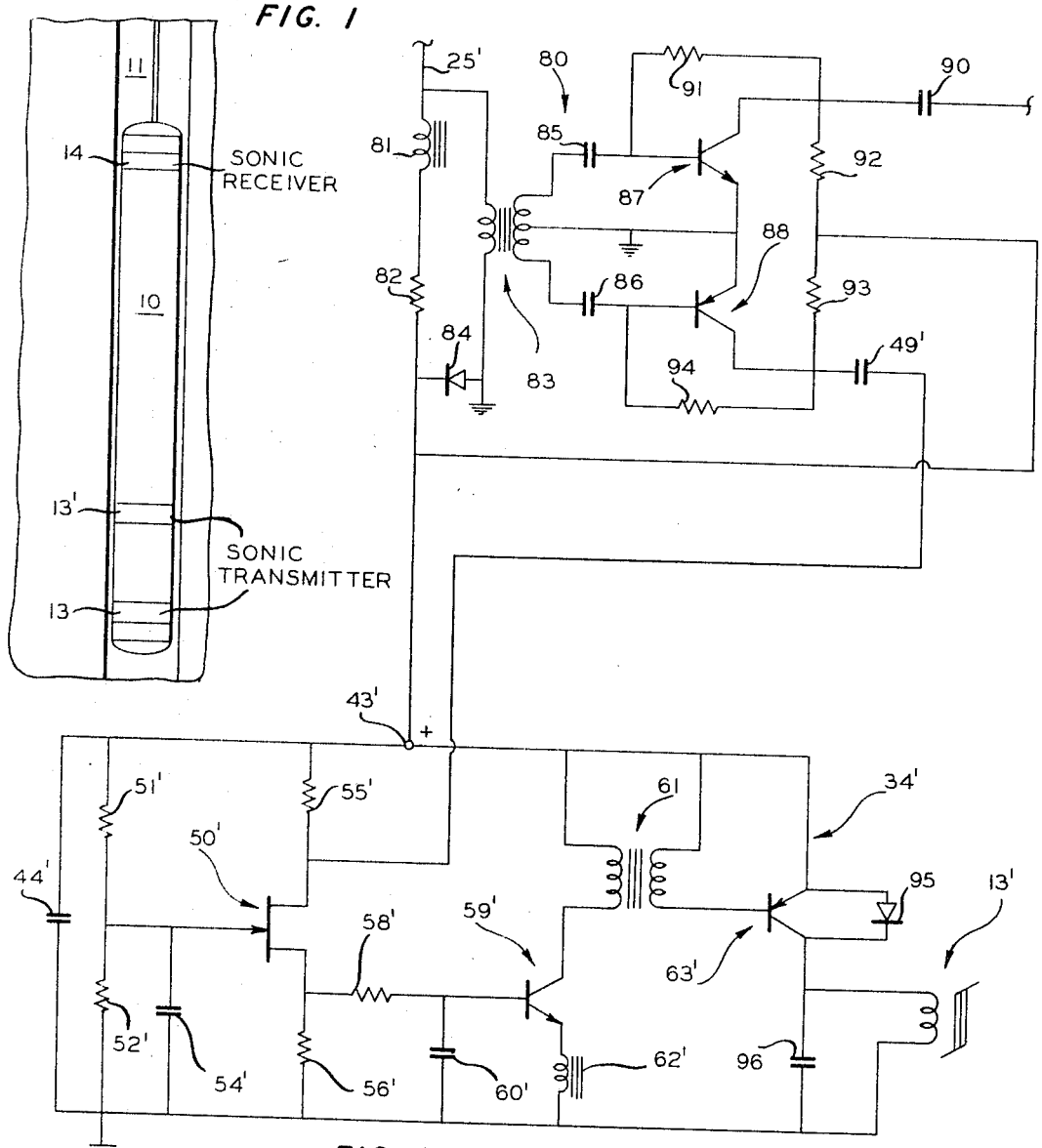

United States Patent Office 3,447,127
Patented May 27, 1969

3,447,127
SONIC LOGGING APPARATUS
Bruce F. Wiley, Bartlesville, Okla., assignor to Phillips Petroleum Company, a corporation of Delaware
Filed Oct. 13, 1967, Ser. No. 675,201
Int. Cl. G01v 1/40
U.S. Cl. 340—18     6 Claims

ABSTRACT OF THE DISCLOSURE

Well logging apparatus comprises a housing supporting a sonic receiver and one or two sonic transmitters spaced therefrom. Operating power for the downhole equipment is supplied by a single lead, which also is used to transmit pulses to a downhole signal generator. When two transmitters are used, they are energized alternately from pulses transmitted downhole.

---

Figure 2:
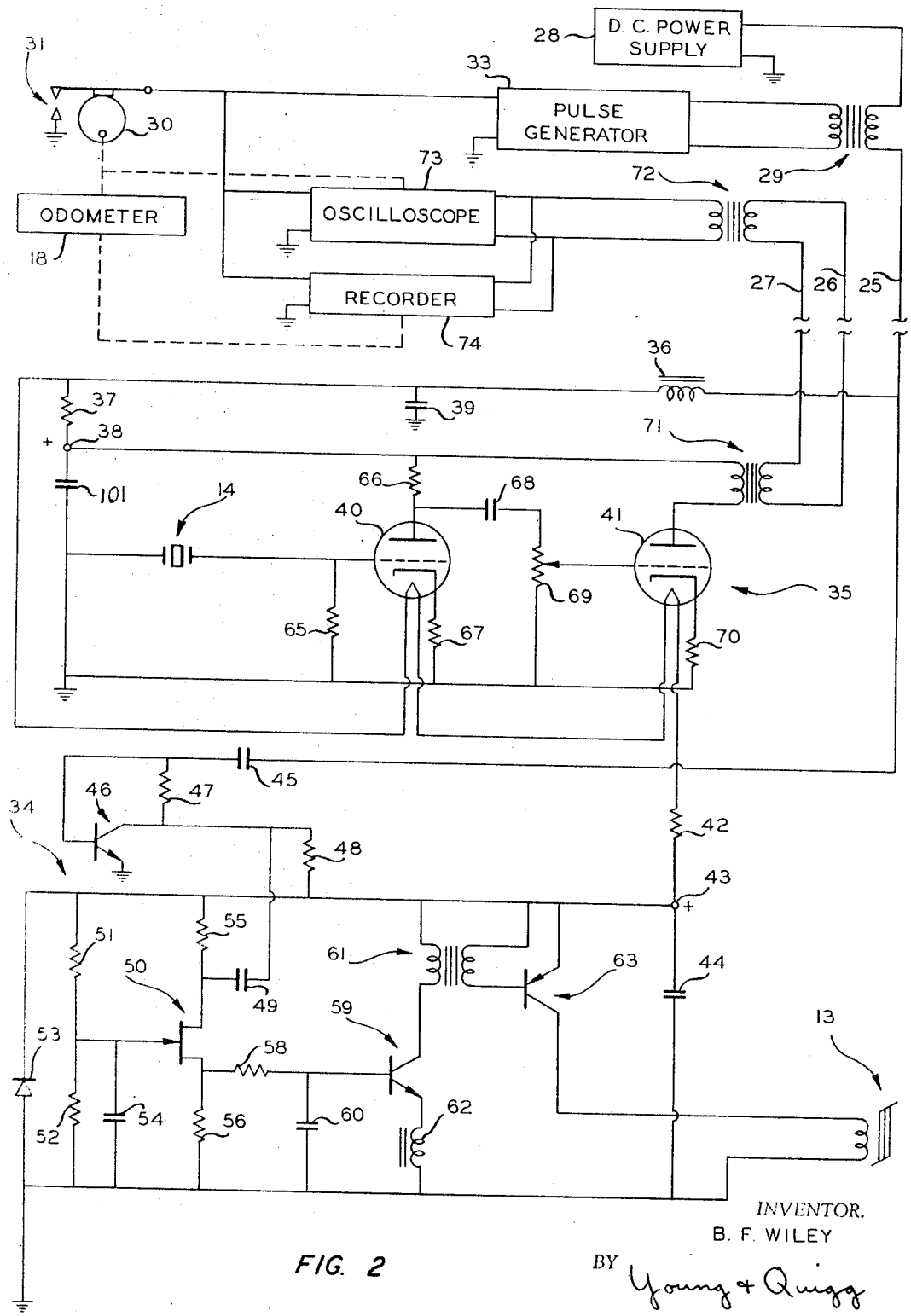

This invention relates to sonic logging of earth formations.

Various types of logging equipment have been developed for use in measuring properties of formations intersected by well bores. One such logging system measures the velocity of propagation of acoustical signals through the formations. This is accomplished by suspending a logging tool which has an acoustic signal generator and one or more receivers mounted thereon in spaced relationship. The time of travel of sound waves from the generator to the receiver or receivers is measured to provide an indication of the velocity transmitting properties of the surrounding formations.

This invention provides improved apparatus for use in making acoustical logs. A power supply, a pulse generator and recording equipment are positioned at the surface of the well. In one embodiment a housing is lowered into a well to support an acoustical signal transmitter and a receiver. The housing also carries a signal generator, which energizes the transmitter when pulses are received from the surface, and an output amplifier which is associated with the detector. A single lead is employed to supply power from the surface power supply to the downhole signal generator and amplifier. In addition, the pulse generator at the surface is coupled to this lead to transmit actuating pulses from the pulse generator to the downhole signal generator, thereby providing a circuit which requires a minimum number of connecting leads. In another embodiment of this invention, two signal generators and transmitters are carried by the housing. Circuit means are provided to energize the generators alternately.

Accordingly, it is an object of this invention to provide improved apparatus for use in making acoustical logs in wells.

Another object is to provide circuit means for operating acoustical logging equipment in wells with a minimum number of connecting leads between the surface equipment and the downhole equipment.

Other objects, advantages and features of the invention should become apparent from the following detailed description, taken in conjunction with the accompanying drawing in which:

FIGURE 1 is a schematic representation of the acoustical logging equipment of this invention. FIGURE 2 is a schematic circuit drawing of a first embodiment of the electrical components associated with the apparatus of FIGURE 1. FIGURE 3 is a schematic circuit drawing of a second embodiment of a portion of the electrical components associated with the downhole equipment.

Referring now to the drawing in detail and to FIGURE 1 in particular, there is shown an elongated housing 10 which is suspended within a well bore 11 by means of a cable 12. A sonic transmitter 13 and a receiver 14 are mounted on housing 10 in spaced relationship with one another. A second sonic transmitter 13' can be mounted in spaced relationship with sonic transmitter 13 and receiver 14 when the use of two transmitters is desired. Acoustical signals generated by transmitter 13 travel outwardly through the well bore into the surrounding earth formations and through these formations to receiver 14. The time of transmission of such signals provides an indication of the velocity of transmission through the surrounding formations, and thus an indication of the density of the formations.

The upper end of cable 12 is secured at the surface to a reel 16 which serves to raise and lower housing 10 in the well bore. Reel 16 normally is driven by a suitable motor, not shown. Cable 12 extends from reel 16 over a pulley 17, and an odometer 18 is in engagement with the cable to provide a measurement of the depth to which housing 10 is lowered. The end of cable 12 engages suitable commutator segments on the shaft 19 which supports reel 16 so that the end of cable 12 can be connected by leads 20 to actuating and recording equipment 21. As will be described hereinafter in greater detail, cable 12 contains three electrical leads which extend from the surface equipment to the downhole equipment.

The electrical components of a first embodiment of the apparatus of FIGURE 1 are illustrated in FIGURE 2. Three electrical leads 25, 26 and 27 extend through cable 12 from the surface equipment 21 to housing 10. A DC power supply 28 is positioned at the surface and has one output terminal connected to the upper end of lead 25, the second output terminal of power supply 28 being grounded. The secondary winding of a transformer 29 is connected in the upper portion of lead 25. Odometer 18 is mechanically connected to a cam 30 which serves to open and close a pair of contacts 31, the latter being connected to the input of a pulse generator 33 so that the generator is actuated when contacts 31 are closed. This can take place each time housing 10 is lowered a preselected distance into the well, such as one-half foot, for example. The output of pulse generator 33 is applied to the primary winding of transformer 29 to transmit pulses over lead 25.

The electrical equipment illustrated below the broken lines in FIGURE 2 is contained within housing 10 of FIGURE 1. A signal generator 34 is connected to sonic transmitter 13, and an amplifier 35 is connected to sonic receiver 14. All of this downhole equipment is energized from power supply 28 by means of lead 25. An inductor 36 and a resistor 37 are connected between lead 25 and a terminal 38 which supplies positive operating potential for amplifier 35. A filter capacitor 39 is connected between ground and the junction between inductor 36 and resistor 37 and capacitor 101 is connected between terminal 38 and ground. The heaters of vacuum tubes 40 and 41 of amplifier 35 and a resistor 42 are connected in series between inductor 36 and a terminal 43 which supplies positive operating potential for signal generator 34.

The downhole end of lead 25 is connected to the first plate of a capacitor 45, the second plate of which is connected directly to the base of a transistor 46. A resistor 47 is connected between the collector of transistor 46 and the second plate of capacitor 45. The emitter of transistor 46 is connected to ground. The collector of transistor 46 is connected by a resistor 48 to terminal 43. The collector of transistor 46 is also connected by a capacitor 49 to the first collector of a transistor 50. Resistors 51 and 52 are connected in series relationship between terminal 43 and ground. A voltage regulating Zener diode 53 is connected between ground and terminal 43. The junction between resistors 51 and 52 is connected to the emitter of transistor 50, and a capacitor 54 is connected between this junction and ground. The two collectors of unijunction transistor 50 (which can be type 2N491, for example) are connected to terminal 43 and to ground by respective resistors 55 and 56. The second collector of transistor 50 is connected by a resistor 58 to the base of a transistor 59. A capacitor 60 is connected between the base of transistor 59 and ground. The primary winding of a transformer 61 is connected between the collector of transistor 59 and terminal 43. An inductor 62 is connected between the emitter of a transistor 59 and ground. The secondary winding of transformer 61 is connected between terminal 43 and the base of a transistor 63. The emitter of transistor 63 is connected directly to terminal 43. The collector of transistor 53 is connected to ground through transmitter 13.

As previously mentioned, contacts 31 are closed periodically to actuate pulse generator 33. The output pulses from generator 33, which can be a square wave generator, are connected by transformer 29 to lead 25 and are transmitted to the downhole equipment over this lead. These pulses are applied through capacitor 45 to the input of the one-shut multivibrator circuit which constitutes pulse generator 34. The multivibrator illustrated is energized by negative input pulses which are established by the differentiating circuit of capacitor 45 and resistor 47. The resulting pulses from generator 34 actuate sonic transmitter 13 to generate acoustical signals which are transmitted outwardly from housing 10 of FIGURE 1. These signals are received by sonic receiver 14, which is connected to the input circuit of amplifier 35 of FIGURE 2.

Receiver 14, which can be a piezoelectric transducer, is connected between the control grid of vacuum tube 40 and ground. A resistor 65 is connected in parallel with receiver 14. The anode of tube 40 is connected to terminal 38 by a resistor 66, and the cathode of tube 40 is connected to ground by a resistor 67. The anode of tube 40 is also connected by a capacitor 68 and a potentiometer 69 to ground. The contactor of potentiometer 69 is connected to the control grid of tube 41. The cathode of tube 41 is connected to ground by a resistor 70. The primary winding of a transformer 71 is connected between the anode of tube 41 and terminal 38. The two end terminals of the secondary winding of transformer 71 are connected to respective leads 26 and 27. The upper ends of these leads are connected to the primary winding of a transformer 72. The secondary winding of transformer 72 is connected to an oscilloscope 73 and to a recorder 74.

The sonic signals received by element 14 are amplified by the two stage vacuum tube amplifier illustrated and transmitted to the surface by leads 26 and 27. These signals are displayed on oscilloscope 73, the sweep of which can be triggered by odometer 18. The time of arrival of the transmitted pulse can thus be observed on oscilloscope 73 with respect to the time of signal generation by pulse generator 33. The received signals are also recorded on recorder 74, which can be driven by odometer 18 to correlate the recorded signals with the depth to which housing 10 is lowered.

The apparatus thus far described employs only a single sonic transmitter 13. However, in some applications it is desirable to employ two spaced transmitters 13 and 13', as illustrated in FIGURE 1. By actuating these two transmitters at different times it is possible to obtain information regarding the difference between the times required for the sonic vibrations to travel from the two transmitters to the receiver. This difference is useful in many situations in determining the density of the surrounding formations. The use of two signals tends to cancel variables resulting from the sound traveling through well fluids to the formations. The difference between travel times of the two signals is caused only by the different lengths of travel through the formations. FIGURE 3 illustrates apparatus which can be used to actuate the two transmitters alternately. In this apparatus, a phase splitter 80 is employed to establish negative pulse generating trigger pulses alternately from the square wave output of pulse generator 33.

An inductor 81 and a resistor 82 are connected between lead 25' and terminal 43'. The primary winding of a transformer 83 is connected between lead 25' and ground. A voltage regulating Zener diode 84 is connected between ground and terminal 43. The center tap of the secondary winding of transformer 83 is connected to ground. The end terminals of the secondary winding are connected by respective capacitors 85 and 86 to the bases of respective transistors 87 and 88. The emitters of these two transistors are connected to ground. The collector of transistor 88 is connected by capacitor 49' to the first collector of transistor 50' of signal generator 34'. The collector of transistor 87 is connected between capacitor 90 to a second signal generator, not shown, which is identical to signal generator 34' and which is connected to transmitter 13. Resistors 91, 92, 93 and 94 are connected in series between the bases of transistors 87 and 88. The collector of transistor 87 is connected to the junction between resistors 91 and 92, and the collector of transistor 88 is connected to the junction between resistors 93 and 94. The junction between resistors 92 and 93 is connected to terminal 43'.

A negative input pulse to phase splitter 80 provides a negative output pulse through capacitor 90, where as a positive input pulse to phase splitter 80 provides a negative output pulse through capacitor 49'. Thus, negative trigger pulses for the two downhole signal generators are supplied alternately by the phase splitter when it receives alternate positive and negative pulses from pulse generator 33. The circuit of signal generator 34' which is illustrated in FIGURE 3 is substantially identical to that of signal generator 34 of FIGURE 2 and corresponding elements are designated by like primed reference numerals. Although a few minor circuit differences are shown, either circuit can be employed. As illustrated in FIGURE 3, a rectifier 95 is connected between the emitter and collector of transistor 63', and a capacitor 96 is connected in parallel with transmitter 13'.

In one specific embodiment of this invention, odometer 18 and cam 30 are designed so that contacts 31 are closed each time cable 12 is moved six inches through the well. Pulse generator 33 is designed to produce pulses at the rate of sixteen per second, and contacts 31 are closed for a sufficient period to generate one such pulse. Housing 10 is moved through the well at a speed of ten feet per minute. If desired, recorder 74 can be a digital recorder which includes an analog to digital converter in its input. Such a recorder can be triggered periodically by the output of pulse generator 33 so as to avoid recording each and every pulse transmitted. As an alternative, contacts 31 can be closed less frequently.

While this invention has been described in conjunction with presently preferred embodiments, it obviously is not limited thereto.

What is claimed is:
1. Sonic measuring apparatus comprising:
   a housing adapted to be lowered into a well;
   a sonic transmitter and a sonic receiver carried by said housing in spaced relationship with one another;
   a signal generator carried by said housing and having its output connected to said transmitter, said signal generator actuating said transmitter when a pulse is applied to its input;
   a signal amplifier carried by said housing and having said receiver connected to its input;
   a pulse generator adapted to be positioned at the surface of the earth;
   a power source adapted to be positioned at the surface of the earth;
   signal recording means adapted to be positioned at the surface of the earth;

a lead extending from said power source to said signal generator and to said amplifier to supply operating power thereto;

means connecting the output of said pulse generator to said lead;

circuit means carried by said housing to connect said first lead to the input of said signal generator;

output signal transmitting means extending from the output of said amplifier to said recording means;

means to lower said housing into a well; and means responsive to said means to lower to energize said pulse generator each time said housing is moved a predetermined distance through the well.

2. The apparatus of claim 1, further comprising means to drive said signal recording means responsive to said means to lower so that the signals recorded by said recorder are correlated with the depth to which said housing is lowered into the well.

3. The apparatus of claim 2 wherein said signal recording means comprises an oscilloscope and wherein said means to drive said recording means comprises means to generate a sweep signal on said oscilloscope in predetermined time relationship with said pulse generated being energized.

4. Sonic measuring apparatus comprising:
a housing adapted to be lowered into a well;
a sonic transmitter and a sonic receiver carried by said housing in spaced relationship with one another;
a signal generator carried by said housing and having its output connected to said transmitter, said signal generator actuating said transmitter when a pulse is applied to its input;
a signal amplifier carried by said housing and having said receiver connected to its input;
a pulse generator adapted to be positioned at the surface of the earth;
a power source adapted to be positioned at the surface of the earth;
signal recording means adapted to be positioned at the surface of the earth;
a lead extending from said power source to said signal generator and to said amplifier to supply operating power thereto;
means connecting the output of said pulse generator to said lead;
circuit means carried by said housing to next said first lead to the input of said signal generator;
output signal transmitting means extending from the output of said amplifier to said recording means;
a second sonic transmitter carried by said housing in spaced relationship with said sonic receiver and the first mentioned sonic transmitter;
a second signal generator carried by said housing and having its output connected to said second transmitter, said second signal generator actuating said second transmitter when a pulse is applied to the input of said second signal generator;
second circuit means carried by said housing to connect said lead to the input of said second signal generator; and
means carried by said housing to actuate the two signal generators alternately through said circuit means in response to pulses received from said pulse generator.

5. The apparatus of claim 4 wherein said means to actuate said signal generators comprises a phase splitter having first and second outputs, said first output being connected to the first mentioned signal generator and the second output being connected to said second signal generator, and means connecting the input of said phase splitter to said lead such that an input pulse to said phase splitter of a first polarity provides an output pulse at the first output of said phase splitter and an input pulse to said phase splitter of opposite polarity provides an output pulse at the second output of said phase splitter.

6. The apparatus of claim 5 wherein said pulse generator is a square wave signal generator; said signal generators are one shot multivibrators which are triggered by pulses of common polarity; and said phase splitter provides output pulses of such common polarity.

References Cited

UNITED STATES PATENTS 3,112,466  11/1963  Engle et al. _____ 340—18

RICHARD A. FARLEY, *Primary Examiner.*

C. E. WANDS, *Assistant Examiner.*

U.S. Cl. X.R.

181—.5